United States Patent
Matsuo (10) Patent No.: US 6,839,314 B2
(45) Date of Patent: *Jan. 4, 2005

(54) OPTICAL PICKUP (75) Inventor: Daisuke Matsuo, Kodaira (JP)

(73) Assignee: Olympus Optical Co., Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 10/687,949

(22) Filed: Oct. 17, 2003

(65) Prior Publication Data

US 2004/0081061 A1 Apr. 29, 2004

Related U.S. Application Data (63) Continuation of application No. 09/559,860, filed on Apr. 27, 2000, now Pat. No. 6,671,246.

(30) Foreign Application Priority Data

Apr. 28, 1999 (JP) ............................................ 11-121715
May 10, 1999 (JP) ............................................ 11-128469

(51) Int. Cl.$^7$ ................................................. G11B 7/00
(52) U.S. Cl. .............................. 369/112.01; 369/112.18
(58) Field of Search .......................... 369/13.19, 13.33, 369/13.55, 44.14, 44.15, 44.16, 44.24, 112.01, 112.02, 112.06, 112.11, 112.17, 112.18, 112.23, 13.15, 112.26

(56) References Cited

U.S. PATENT DOCUMENTS 5,125,750 A    6/1992 Corle et al.
5,729,393 A    3/1998 Lee et al.
5,764,613 A    6/1998 Yamamoto et al.
6,069,853 A    5/2000 Novotny et al.
6,108,292 A    8/2000 Zijp
6,256,267 B1   7/2001 Hatam-Tabrizi
6,307,689 B1  10/2001 Ichimura et al.
6,307,832 B1  10/2001 Novotny et al.
6,320,708 B1  11/2001 Ueyanagi et al.
6,449,221 B1   9/2002 Knight et al.

FOREIGN PATENT DOCUMENTS

JP    2553275 B2    8/1996
JP    8-315404 A    11/1996

OTHER PUBLICATIONS

Nikkei Electronics, pp. 99–105M BI, 691, Published on Jun. 16, 1997.

Primary Examiner—Thang V. Tran
Assistant Examiner—Bach Vuong
(74) Attorney, Agent, or Firm—Frishauf, Holtz, Goodman & Chick, P.C.

(57) ABSTRACT

An optical pickup is provided which includes a light source, an optical system for converging a laser beam emitted from the light source, and an optical element having a function of increasing a numerical aperture of the optical system, wherein recording and/or reproducing information on a recording medium is performed by using the laser beam from the light source while the optical element is brought in contact with or in close to the recording medium, and the optical element has a contamination-preventing structure.

5 Claims, 4 Drawing Sheets

OPTICAL PICKUP

CROSS-REFERENCE TO RELATED APPLICATIONS

The present application is a continuation application of U.S. application Ser. No. 09/559,860, filed Apr. 27, 2000, now U.S. Pat. No. 6,671,246 and claims the benefit of priority under 35 USC 119 of Japanese Patent Application No. 11-121715, filed on Apr. 28, 1999, and Japanese Patent Application No. 11-128469, filed on May 10, 1999, the entire contents of which are incorporated herein by reference.

BACKGROUND OF THE INVENTION

The present invention relates to an optical pickup in which an optical element having a function for increasing the numerical aperture, for example, a SIL (Solid Immersion Lens) or the like, is disposed close to a recording medium to perform recording and/or reproducing of information on the recording medium at a high density.

Japanese Patent Publication No. 2,553,275 discloses an optical system which is capable of performing recording and/or reproducing of information on a recording medium. In this conventional optical system, converging light from an objective lens is further converged through a semi-spherical SIL so that a diameter of a spot formed on a recording layer of the recording medium is reduced. The semi-spherical SIL increases the numerical aperture of the optical system by a multiple corresponding to its own refractive index.

In an information recording and reproducing technique of the optical system, when information is recorded on the recording layer of the recording medium and it is reproduced from the recording layer, it is necessary to put the semi-spherical SIL in much close to the recording layer. The distance from the semi-spherical SIL to the recording layer is significantly small as compared with the distance from an objective lens to the recording layer in a conventional information recording and reproducing technique of another kind in which light converged by only the objective lens is projected through a front side surface of such a recording medium as a CD (Compact Disc) or a MO (Magneto-Optical Disc) onto a recording layer on a back side surface thereof to perform recording and reproducing of information on is the recording layer. For this reason, the recording and reproducing technique using the SIL is called as a near field recording and reproducing technique, while the recording and reproducing technique using only the objective lens is called as a far field recording and reproducing technique.

Nikkei Electronics, Pages 99 to 105, issued on Jun. 16, 1997 (No. 691) has disclosed improvement for such a near field recording and reproducing technique. In the improved near field recording and reproducing technique, a super semi-spherical SIL or a stigmatic focusing SIL is used instead of the semi-spherical SIL. The super semi-spherical SIL or the stigmatic focusing SIL increases the numerical aperture of an optical system using the same by a multiple equal to the second power of the refractive index thereof.

Japanese Patent Application KOKAI Publication No. 8-315404 has disclosed an optical pickup having an optical system in which an objective lens and a generally semi-spherical SIL are combined. The optical pickup records information on and reproduces it from a recording surface in a state where the generally semi-spherical SIL is brought in much close to a thin cover glass which covers the recording surface of the recording medium.

In the plurality of the conventional techniques described above, when recording and/or reproducing of information is performed on the recording layer of the recording medium by using the SIL, it is necessary to bring the SIL in much close to the recording layer. In a typical example, the SIL is brought in close to the recording layer up to at least 500 m$\mu$ or less, or 200 nm or less. Incidentally, the numerical aperture increased by a lens with a high numerical aperture is at least 0.65 or more. In recent years, a technique for increasing the numerical aperture to 0.8 to 0.9 or more has been published in relevant academic meetings.

However, in the above-mentioned conventional near field recording and reproducing techniques, there are the following problems.

Though the recording layer on the front side surface of the recording medium is covered with a thin transparent protective film, contaminant such as moisture, organic materials, dusts and the like in the atmosphere adheres to the front side surface of the protective film. Accordingly, when the recording medium is rotated in order to perform recording and/or reproducing of information on the recording layer on the front side surface of the recording medium in a state where the SIL has been brought in much close to the recording surface on the front side surface of the recording medium, contaminant is scattered by a centrifugal force acting thereon and the contaminant is adhered and deposited on the SIL. Particularly, the contaminant which has been scattered from the protective film of the recording medium is adhered and deposited on a facing surface of the SIL facing the protective film. When the adhesion and deposition of such contaminant on to an optically effective area on the facing surface of the SIL become heavy, the transmittance of laser beam on the optically effective area is gradually decreased (the optical performance of the SIL is gradually lowered), so that it becomes difficult to record information on and/or reproduce it from the recording surface of the front side surface of the recording medium for a long time of period.

BRIEF SUMMARY OF THE INVENTION

The present invention has been derived from these circumstances, and an object of the present invention is to provide an optical pickup which prevents an optical performance of an optical element, such as a lens with a high numerical aperture, including a SIL and disposed close to a recording layer of a recording medium from lowering due to adhesion and deposition of contaminant onto the optical element even under use for a long period of time, and which can stably perform recording and/or reproducing of information on a recording medium for a long period of time.

In order to achieve the object of the present invention, an optical pickup according to the present invention comprises: a light source for emitting laser beam; an optical system for converging the laser beam from the light source; and an optical element having a function for increasing a numerical aperture of the optical system, wherein recording and/or reproducing of information on a recording medium is performed by using the laser beam from the light source while the optical element is brought in contact with or brought in close to the recording medium, and the optical element has a contamination-preventing structure.

In the optical pickup according to the present invention and structured as described above, the contamination-preventing structure of the optical element may include a water-repellent portion which is provided on at least an optically effective area in a surface portion, facing the recording medium, in the optical element and prevents contaminant from adhering and depositing on the at least optically effective area, it may include a contaminant attracting portion which is provided on an area except the optically effective area in the surface portion, facing the recording medium, in the optical element and attracts contaminant, or it may include a projection which is provided on at least the optically effective area in the surface portion, facing the recording medium, in the optical element and increases flow rate and pressure of air flowing between the recording medium and the projection.

The water-repellent portion may have a coating of a predetermined water-repellent material, and may have an ion implanted layer formed by implantation of predetermined ions.

The predetermined water-repellent material may be inorganic material or organic material.

Also, the predetermined ion may be selected from one or more of at least nitrogen, carbon, fluorine, and silicon.

Furthermore, the optical element is a solid immersion lens (SIL).

The contaminant attracting portion may include a rough surface which is rougher than the optically effective area in the surface portion, facing the recording medium, of the optical element or a plurality of grooves, and the rough surface may be formed by performing chemical etching or physical etching on the area, except the optically effective area, in the surface portion, facing the recording medium, of the optical element.

The contaminant attracting portion may be combined with a water-repellent portion provided at the optically effective area in the surface portion, facing the recording medium, of the optical element.

The contaminant attracting portion may include a thin film of metallic oxide.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

Referring to the above accompanying drawings, the optical pickups according to some embodiments and modifications thereof according to the present invention will now be described in detail.

DETAILED DESCRIPTION OF THE INVENTION

First Embodiment

An optical pickup according to a first embodiment of the present invention will now be described with reference to FIGS. 1 and 2.

Figure 1:
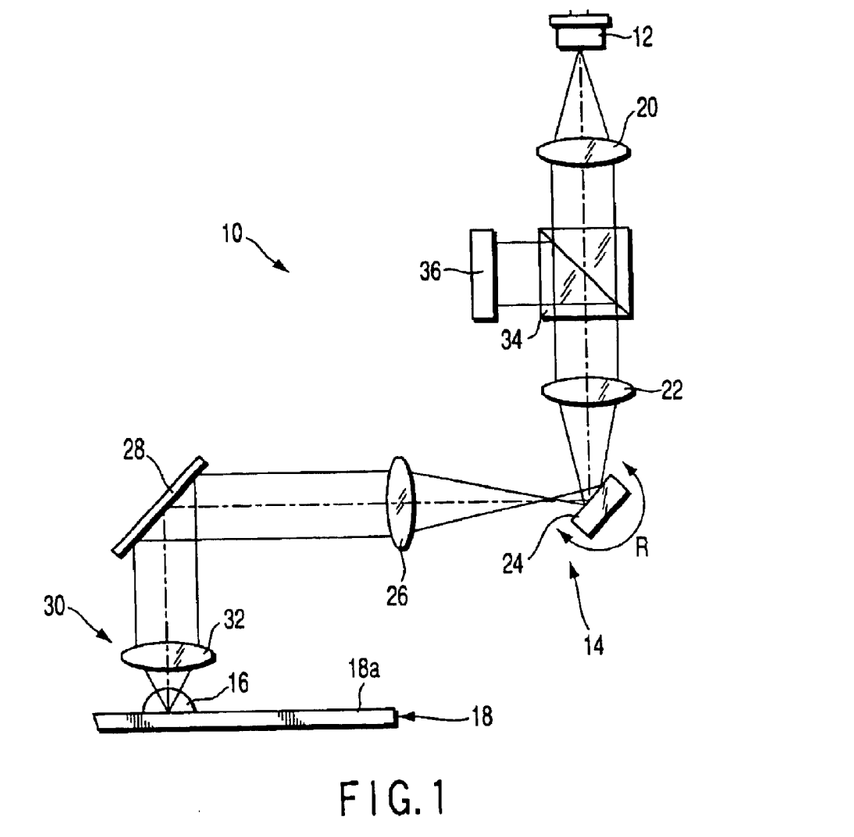
FIG. 1 is a schematic view of an overall structure of an optical system in an optical pickup according to a first embodiment of the present invention.
Figure 2:
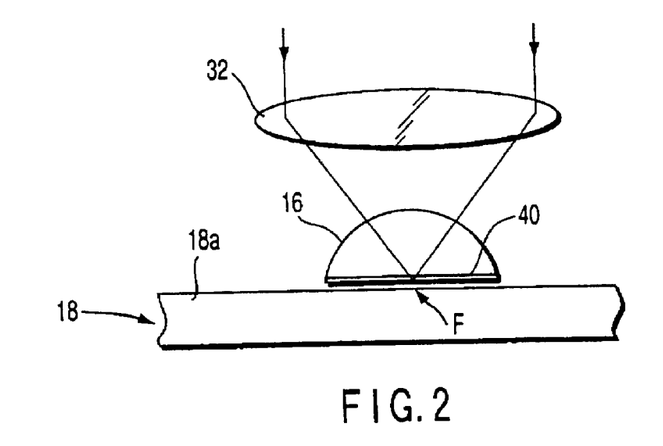
FIG. 2 is a schematic enlarged side view of a semi-spherical SIL which is employed as an optical element in the optical system shown in FIG. 1 to increase a numerical aperture of the optical system.

As shown in FIG. 1, an optical pickup 10 of the first embodiment comprises a light source (a semiconductor laser) 12 which is capable of emitting a laser beam, an optical system 14 for converging the laser beam emitted from the light source 12, and an optical element 16 having a function which increases a numerical aperture of the optical system 14. While the optical element 16 contacts with or is made closer to a recording layer 18a of a recording medium 18, the optical pickup 10 projects the laser beam from the light source 12 on the recording layer 18a of the recording medium 18 via the optical system 14 and the optical element 16 thereby performing recording and/or reproducing information on the recording layer 18a.

In this embodiment, the recording medium 18 has a disk-like shape and is rotated at a predetermined speed in a predetermined direction during performing recording and/or reproducing information on the recording layer 18a.

More specifically, the optical system 14 comprises a collimator lens 20 for converting the laser beam from the light source 12 into a parallel beam, a relay lens 22 for converging the parallel beam from the collimator lens 20, an optical deflection element 24, such as a galvanomirror, for scanning the laser beam converged by the relay lens 22 in a predetermined opposite directions denoted by R, an imaging lens 26 for converting laser beam reflected by the optical deflection element 24 and diverging to a parallel beam, a reflecting mirror 28 for directing the parallel laser beam from the imaging lens 26 towards the recording layer 18a of the recording medium 18, and an optical head 30 disposed in the vicinity of the recording layer 18a of the recording medium 18, for projecting the parallel beam from the reflecting mirror 28 on the recording layer 18a of the recording medium 18.

The optical head 30 includes an objective lens 32 for converging the parallel beam from the reflecting mirror 28 and the optical element 16 described above. The optical element 16 has a semi-spherical SIL (solid immersion lens) for further converging the laser beam focused by the objective lens 32 to reduce a diameter of a spot formed on the recording layer 18a of the recording medium 18. It is widely known that the semi-spherical SIL having a higher level of refractive index functions to increase the numerical aperture of the optical system 14 in the optical pickup 10. That is, the semi-spherical SIL is a kind of high numerical aperture lens.

The optical system 14 further has a beam splitter 34 disposed in an optical path between the collimator lens 20 and the relay lens 22. The beam splitter 34 allows the parallel beam running from the collimator lens 20 to the relay lens 22 to pass therethrough and branches the parallel beam running from the relay lens 22 to the collimator 20. In other words, the reflected laser beam which has reflected on the recording layer 18a of the recording medium 18 and returned to the relay lens 22 along the aforementioned optical path reversely is branched from the optical path by the beam splitter 34.

The optical system 14 further comprises a light-receiving element 36 for receiving the reflected laser beam branched by the beam splitter 34 and outputting an electric signal according to change of a light-receiving position and an amount of received light (that is, a tracking state detection signal and an information recording signal and/or an information reproducing signal on the recording layer 18a of the recording medium 18).

It is necessary for the optical pickup 10 to move the optical head 30 relatively along the recording layer 18a in a radial direction of the recording medium 18 when the recording and/or reproducing information is performed on the recording surface 18a of the recording medium 18. A mechanism for this relative movement has a swing arm system and a linear movement system. Both of the systems are applicable to the optical pickup 10 of this embodiment.

By such a relative movement, the spot of the converged laser beam projected from the optical element 16 of the optical head 30 to the recording layer 18a of the recording medium 18 can be moved along a predetermined track on the recording layer 18a (rough tracking control). The position of the spot relative to the predetermined track during the rough tracking control is finely adjusted by rotating the galvanomirror 24 in the opposite directions denoted by the arrow R (fine tracking control).

As described above, while the recording medium 18 rotates at a predetermined speed in a predetermined direction, the optical element 16 of the optical head 30 disposed over the recording layer 18a of the recording medium 18 is slightly floated from the recording layer 18a of the recording medium 18 by a layer of air flowing at high speed with the recording layer 18a of the recording medium 18, and stabilized. Thus, since the spot of the converged laser beam projected from the optical element 16 towards the recording layer 18a is stably focused onto a predetermined track on the recording layer 18a, it is unnecessary to carry out a focusing control for controlling a converged position of the above spot relative to the predetermined track in a direction along an optical axis of the converged laser beam projected from the optical element 16 to the recording layer 18a.

The optical element 16 of the optical pickup 10 of this embodiment further includes a contamination-preventing structure for preventing any contaminant (for example, moisture, organic materials, or dusts in the air) from attaching to the optical element 16 and decreasing the optical properties of the optical element 16, so that the optical pickup 10 can be operated stably to perform recording and/or reproducing information on the recording layer 18a of the recording medium 18 for a long period of time.

The semi-spherical SIL constituting the optical element 16 in this embodiment may preferably be formed of an optical glass manufactured by OHARA INC. of Sagamihara-shi, Kanagawa prefecture, in Japan and available in the trade name of TIH53. A water-repellent portion 40 which is capable of preventing adhesion of contaminant is provided in at least an optically effective area F of a flat surface facing the recording layer 18a of the recording medium 18, in the optical element 16.

The optically effective area F on the optical element 16 is a central area in the flat surface portion facing the recording layer 18a of the recording medium 18, of the optical element 16, which is used for further converging the laser beam converged by the objective lens 32 through the optical element 16 to focus on the recording layer 18a of the recording medium 18.

In this embodiment, the water-repellent portion 40 is formed by performing a water-repellent process on the entire of the flat surface of the optical element 16 including the optically effective area F.

For example, as the water-repellent process a method for coating inorganic material on the surface of the optical element 16 facing the recording medium 18 with a predetermined thickness can be applied. In the following Table 1, various inorganic coating materials exhibiting the contamination-preventing effect which is the object of the present invention are shown. For example, vapor deposition, spattering, ion plating or the like can be selected for the coating method. Also, a thickness of the coating is preferably set to a range of about 10 nm to about 50 nm.

TABLE 1

| | Coating material | Contaminant preventing effect |
|---|---|---|
| Example 1 | Magnesium fluoride | Yes |
| Example 2 | Graphite fluoride | Yes |
| Example 3 | Lanthanum fluoride | Yes |
| Example 4 | Nitride silicon | Yes |
| Example 5 | Silicon nitride | Yes |
| Example 6 | Silicon Carbide | Yes |
| Comparative material | Silicon oxide | Non |

Incidentally, for example, fluoride such as $MgF_2$, graphite fluoride or the like, nitride such as SiN or the like and carbide such as SiC or the like other than the inorganic materials shown in Table 1 can exhibit the contamination-preventing effect which is the object of the invention, and these materials can be coated on the surface facing the recording medium 18, of the optical element 16 by deposition, spattering, ion plating or the like.

The degree of the contamination-preventing effect corresponds to the degree of the water-repellent performance, and the degree of the water-repellent performance can define a contact angle of water. On a surface of glass material which is normally used for forming a lens and on which the water repellent process is not performed or merely in organic material is coated as an ordinal scratch protective film, the contact angle of water is in a range of 0° to about 30° (when the in organic material is silicon oxide which is shown as the comparative material in the above Table 1, the contact angle of water is 10° or less), and these materials have no water-repellent performance. On the other hand, on the water-repellent portion 40 in the present embodiment, the contact angle of water is 60° or more, preferably 90° or more. Thus, as the contact angle is larger, the degree of the water-repellent performance becomes higher, so that the degree of the contamination-preventing effect is elevated.

Also, as the water-repellent property of the water-repellent portion 40 increases, the coefficient of friction between the recording surface 18a of the recording medium 18 and the surface portion of the optical element 16 positioned on the side of the recording medium 18 is decreased. Thus, since the slidability of the surface portion of the optical element 16 positioned on the recording medium side of the optical element 16 relative to the recording layer 18a of the recording medium 18 is improved, scattering of contaminant from the recording layer 18a of the recording medium 18 becomes small, even if the surface portion of the optical element 16 positioned on the recording medium side of the optical element 16 contacts with the recording layer 18a.

Further, since the coating method is applied to the water-repellent treatment, the water-repellent portion 40 is formed at once, thereby increasing the productivity and the stability of quality of the optical element 16.

According to this embodiment, since the water-repellent portion 40 is provided on at least the optically effective area F of the surface portion of the optical element 16 positioned on the recording medium side of the optical element 16, contaminant scattered from the recording medium 18 which is rotated at high speed during performing recording and/or reproducing information will not attach to and deposit on at least the optically effective area F. As a result, the optical properties of the optical element 16 can not be reduced due to any contaminant so that the optical pickup 10 can stably perform recording and/or reproducing information on the recording layer 18a of the recording medium 18 for a long period of time.

While the present invention is not limited to the above embodiment, some modifications as described below may be possible.

In the aforementioned embodiment, the water-repellent portion 40 is provided on the entire recording medium side surface of the optical element 16, however, the same effects as those of the above embodiment can be obtained even though the water-repellent portion 40 is only provided on the optically effective area F in the surface portion of the optical element 16 positioned on the recording medium side of the optical element 16.

Materials, which are used to provide the water-repellent portion 40 in at least the optically effective area F of the surface portion of the optical element 16 positioned on the recording medium side of the optical element 16 by the various coating methods described above, are not limited to materials shown in Table 1 in the above embodiment. It may be selectable from various materials, such as DLC (Diamond Like Carbon), which have the water-repellent effect and are capable to be provided on at least the optically effective area F in the surface portion of the optical element 16 positioned on the recording medium side of the optical element 16.

Further, it is effective, in view of the optical properties of the optical element 16, that a coating layer for anti-reflection effects or polarization properties is provided as an under layer for the water-repellent portion 40 on the surface portion of the optical element positioned on the recording medium side of the optical element 16. However, if the thickness of the layer of the water-repellent portion 40 is controlled to be, e.g., ¼ of the wavelength of the laser beam which passes through the water-repellent portion 40 of the optical element 16, the same optical properties as those in the case that the underlying layer is provided on the optical element 16 can be obtained even though the underlying layer is not provided.

That is, even in the case that various surface coating for adding various optical properties are provided on at least the optically effective area F of the surface portion of the optical element 16 positioned on the recording medium side of the optical element 16, when the water-repellent portion 40 is provided on the outermost surface coating in these various surface coatings, the optical element 16 shows various optical properties described above while the same effects as those in the first embodiment can be obtained.

In the above embodiment, the water-repellent portion 40 is formed by the coating method, however, the water-repellent portion 40 which shows the same effects as those in the above embodiment can be constituted even by using ion implantation method.

In the ion implantation method, ions such as nitrogen ions, carbon ions, fluorine ions, or a combination of silicon ions and carbon ions is implanted in the at least optically effective area F of the surface portion of the optical element 16 positioned on the recording medium side of the optical element 16 to form an ion implanted layer with a predetermined thickness which constitutes the water-repellent portion 40. The thickness of the ion implanted layer is preferably set within a range from several nm to about one hundred nm.

The water-repellent treatment by such ion implantation does not change a surface configuration (dimensions) of the surface (the surface portion of the optical element positioned on the recording medium side and including the optically effective area F) of the optical element 16 where a high level of the accuracy is required. Also, as different from the coating method, there is formed no definite boundary between the water-repellent portion 40 constituted by the ion implanted layer and the portion where the water-repellent portion 40 is not provided on the recording medium side surface of the optical element 16, thus the water-repellent portion 40 becomes stronger against heat or external mechanical force so that the water-repellent portion 40 constituted by the ion implanted layer will not be separated from the optical element 16 due to heat or external mechanical force.

The water-repellent portion 40 constituted by the ion implanted layer can also has the same effects as of the waver-repellent portion 40 constituted by the coating method described above.

In the aforementioned embodiment, the water-repellent portion 40 is constituted by coating an inorganic material over at least the optically effective area F of the surface portion of the optical element 16, positioned on the recording medium side of the optical element 16, however, it may also be constituted by coating various organic materials shown in Table 2 below over at least the optically effective area F of the surface portion of the optical element 16 positioned on the recording medium side of the optical element 16. The thickness of the coating of the organic material is preferably set within a range from about 10 nm to about 50 nm similar to that in the aforementioned embodiment.

TABLE 2

|  | Coating material | Coating method |
|---|---|---|
| Example 1 | Polytetrafluoroethylene | Chemical Vapor Deposition |
| Example 2 | Fluoride silane surfactant | Spin coating |
| Example 3 | Solvent soluble fluorine plastic, e.g. "Cytop", a trade name of a product of ASAHI GLASS Co., Ltd., Tokyo, Japan | Spin coating |
| Example 4 | Silicone water-repellent surfactant | Dipping |
| Example 5 | Poly-para-xylene, e.g. "Parylene", a tradename of a product of Three Bond Co., Ltd., Tokyo, Japan | vapor deposition |

There are various kinds of organic coating materials having a water-repellent property and capable of being coated over at least the optically effective area F of the surface portion of the optical element positioned on the recording medium side of the optical element 16 thereby increasing the freedom of selection of such organic materials. For example, synthetic resin materials such as PP (polypropylene), PE (polyethylene), and PFA (parfluorealkoxy resin), or, water-repellent surfactants which are commercially available and applied to wind shields for air crafts or automobiles may be used as the organic materials other than those shown in Table 2. Suitable water-repellent surfactants are sold under the trade name "KS-705F" by Shin-Etsu Chemical Co., Ltd., Tokyo, Japan, and the trade name "glaco" by SOFT99 CORPORATION, Osaka, Japan. Also, the coating method may employ, for example, printing other than various coating methods shown in Table 2.

An execution of coating of an organic material usually requires no large-scale equipment. Accordingly, it is very preferable, for producing a small number of optical elements 16 with the water-repellent portion 40, to form the water-repellent portion 40 by coating of an organic material.

The effect of the water-repellent portion 40 constituted by coating of an organic material will substantially be the same as that of the water-repellent portion 40 constituted by coating of an inorganic material described above.

Figures 3, 4A, 4B, 5:
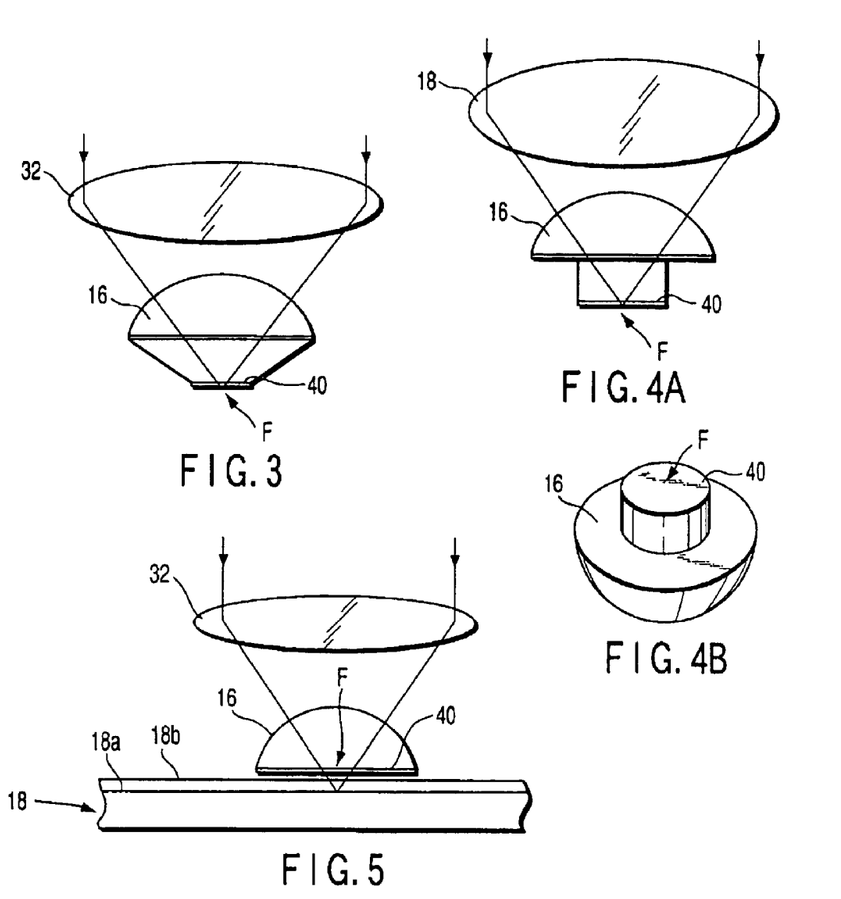
FIG. 3 is a schematic side view of a first modification of the semi-spherical SIL shown in FIG. 2, wherein the other area than an optically effective area of its surface portion facing the recording medium is beveled.
FIG. 4A is a schematic side view of a second modification of the semi-spherical SIL shown in FIG. 2, wherein the other area than the optically effective area of its surface portion facing the recording medium is set back.
FIG. 4B is a perspective view, seen from below, of the set back of the semi-spherical SIL of the second modification shown in FIG. 4A.
FIG. 5 is a schematic side view showing a state in which the semi-spherical SIL shown in FIG. 2 is used for a recording medium whose recording layer is covered with a transparent protective film.

The SIL structure as the optical element 16 with a high numerical aperture to which the water-repellent portion 40 according to the first embodiment and various modifications thereof may be a shape in which the other area, except the optically effective area F, of the surface portion of the optical element 16 positioned on the recording medium side is beveled or chamfered as shown in FIG. 3, or a shape in which the other area, except the optically effective area F, of the surface portion of the optical element 16 positioned on the recording medium side is set back from the optically effective area F as shown in FIGS. 4A and 4B.

Also, as shown in FIG. 5, even in the case that a transparent protective film 18b is provided over the recording layer 18a of the recording medium 18, the optical pickup 10 according to the first embodiment and various modifications thereof, using the optical element 16 having the waters repellent portion 40, and thus featuring the technical spirit of the present invention can be applied to the recording medium 18.

Second Embodiment

Next, referring to FIG. 6, an optical element will be described, which is adopted to an optical system of an optical pickup according to a second embodiment of the present invention in order to increase a numerical aperture of the optical system.

The optical pickup of the second embodiment has the same structure as that of the optical pickup 10 of the first embodiment, except that the contamination-preventing structure provided on the optical element is different from that provided on the optical element 16 of the optical pickup 10 of the first embodiment.

Hence, the components of the optical pickup of the second embodiment which are the same as those of the optical pickup 10 of the first embodiment are denoted by the same reference numerals denoting the same components of the optical pickup 10 of the first embodiment, and detailed description thereof will be omitted.

Figure 6:
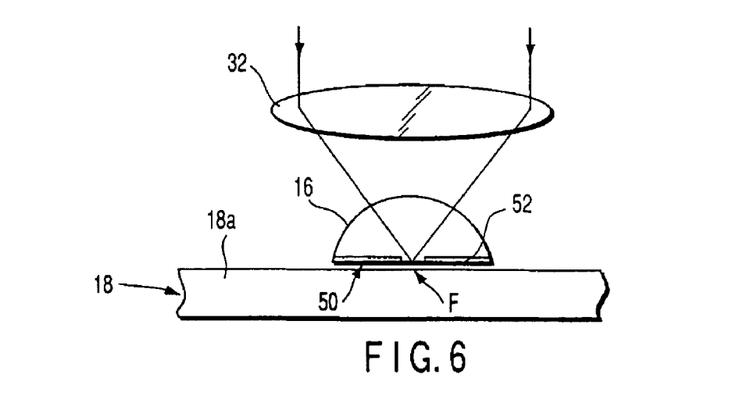
FIG. 6 is a schematic enlarged side view of a semi-spherical SIL which is employed as an optical element of an optical system of an optical pickup according to a second embodiment of the present invention to increase a numerical aperture of the optical system.

As shown in FIG. 6, the contamination-preventing structure of the optical element 16 in the optical pickup of the second embodiment is constituted by a contaminant attracting portion 50 provided on an area located outside of the optically effective area F in the surface portion of the optical element positioned to face the recording layer 18a of the recording medium 18.

The contaminant attracting portion 50 of this embodiment is constituted by a surface 52 rougher than the surface of the optically effective area F, and has an area greater than that of the optically effective area F.

The rough surface 52 acting as the contaminant attracting portion 50 may be formed by etching process. In an example of the etching process, after the optically effective area F of the surface portion of the optical element 16 positioned on the recording medium side of the optical element 16 is covered with a mask (not shown) of slightly larger than the optically effective area F (about 10 m in diameter), chemical etching or physical etching is conducted on a portion, which is not covered with the mask (not shown), other than the optically effective area F of the surface portion of the optical element 16 positioned on the recording medium side of the optical element 16.

In the chemical etching, the other area than the optically effective area F masked in the surface portion of the optical element 16 positioned on the recording medium side of the optical element 16 is slightly dissolved by an etchant such as an acid (for example, by drofluoric acid) or an alkaline chemical to become the rough surface 52. In this case, time required for the chemical etching may preferably be set based on the etching rate which is determined depending on the material of the optical element 16.

In the physical etching, the other area than the optically effective area F masked in the surface portion of the optical element positioned on the recording medium side of the optical element 16 is projected with, for example, an ion beam, an electron beam, or a plasma to form the rough surface 52. In the case of conducting the physical etching with the electron beam, a material of mask used to cover at least the optically effective area F is preferably selected such that the optically effective area F is not affected by the electron beam.

With such etching process, the rough surface 52 having a surface roughness pitched as small as a molecular size can be formed. The surface roughness can be expressed by a surface energy (a contaminant attracting capability) based on a contact angle of water. In this case, a level of the surface roughness of the rough surface 52 is set at the contact angle of 60 degrees or less, preferably at 30 degrees or less, and more preferably 10 degrees or less. Since the surface roughness of the rough surface 52 is so set that the contact angle of water is so small as described above, the rough surface 52 having the surface energy (the contaminant attracting capability) much higher than that of the optically effective area F can be provided.

After the etching process described above is completed and the mask is removed, the resultant rough surface 52 appears whiter and rougher on the surface portion of the optical element 16 positioned on the recording medium side of the optical element 16 other than the optically effective area F which has a mirror-like surface.

As understood from the above description, the optical element 16 in this embodiment has the rough surface 52 provided other than the optically effective area F on the surface portion facing the recording medium 18, and having the surface energy (the contaminant attracting capability) which is higher than that of the optically effective area F. Therefore, contaminant (e.g. vapor, organic materials, or dusts in the air) scattered from the recording medium 18 which is rotated at a high speed during the recording and/or reproducing information on the recording medium 18 is strongly attracted to the rough surface 52 whose surface energy being higher than that of the optically effective area F, and are preferentially attached to the rough surface 52. Accordingly, contaminant are prevented from attaching and depositing on the optically effective area F. As a result, a decrease in the optical properties of the optical element 16 due to contaminant is prevented, and the optical pickup 10 of this embodiment can stably perform recording and/or reproducing information on the recording layer 18a of the recording medium 18 for a long period of time.

The present invention is not limited to the aforementioned embodiment, and various modifications such as explained below will be possible.

The optically effective area F of the surface portion of the optical element 16 positioned on the recording medium side of the optical element 16 may be applied with a coating having another optical effect such as anti-reflection. In this case, the etchant for the contaminant attracting portion 50 is preferably selected from materials which does not affect the coating material.

The optically effective area F on the surface portion of the optical element 16 positioned on the recording medium side of the optical element 16 may be applied with a coating with a water-repellent property, similarly to the first embodiment. Applying of the coating with the water-repellent property to the optically effective area F further improves the contamination preventing effect to the optically effective area F.

Figure 7A:
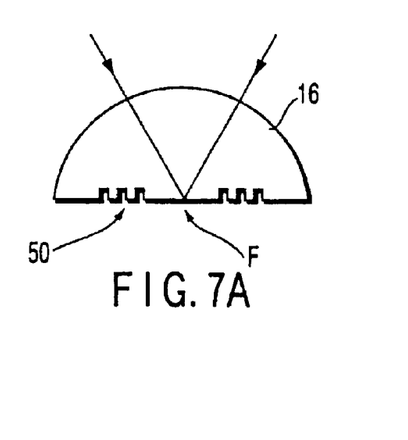
FIG. 7A is a schematic side view of a first modification of the semi-spherical SIL employed as the optical element in the optical pickup of the second embodiment of the present invention.
Figure 7B:
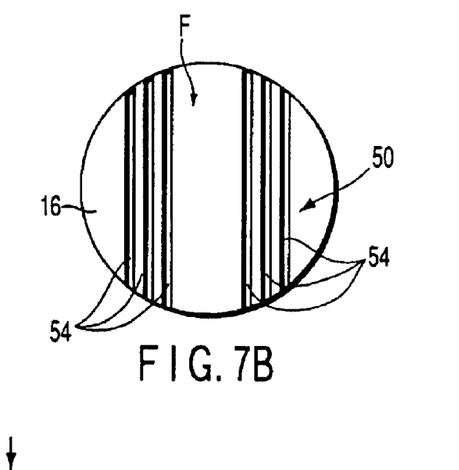
FIG. 7B is a schematic bottom view of the first modification shown in FIG. 7A.

As shown in FIGS. 7A and 7B, the contaminant attracting portion 50 may be constituted by a plurality of grooves 54 (for example, six as shown in the figures) formed outside of the optically effective area F in the surface portion of the optical element 16 positioned on the recording medium side of the optical element 16. In these figures, the same numbers of the plurality of grooves 54 have been respectively allocated to both sides of the optically effective area F, but different numbers of the grooves 54 may be respectively allocated to both of the sides of the optically effective area F.

These grooves 54 may be formed by applying mechanical cutting process to the other area than the optically effective area F in the surface portion of the optical element 16 positioned on the recording medium side of the optical element 16.

Since these grooves 54 causes the surface energy of the attracting portion 50 to be higher than that of the optically effective area F, contaminant (e.g. Vapor, organic materials, or dusts in the air) scattered from the recording medium 18 which is rotated at a high speed during performing the recording and/or reproducing information is strongly attracted by the plural grooves 54 of the attracting portion 50 whose surface energy is high, and are preferentially attached to these grooves 54. Accordingly, the contaminant is prevented form attracting and depositing on the optically effective area F. As a result, a decrease in the optical properties of the optical element 16 due to contaminant does not occur, and the optical pickup 10 of the second embodiment can stably perform recording and/or reproducing information on the recording layer 18a of the recording medium 18 for a long period of time.

According to this modification, the more the number of the grooves 54 of the attracting portion 50 increases, the higher the surface energy (the contaminant attracting capability) of the attracting portion 50 increases.

It is preferable that the plural grooves 54 are formed to extend along a tangential direction relative to a recording track (not shown) formed on the recording layer 18a of the recording medium 18 (See FIG. 1). When the optical element 16 comes very close to the recording layer 18a of the recording medium 18 rotated at a high speed, for performing recording and/or reproducing information on the recording layer 18a of the recoding medium 18, the grooves 54 cause the air flow between the surface portion of the optical element 16 positioned on the recording medium side of the optical element 16 and the recording layer 18a of the recording medium 18 to straighten (to hard to become a turbulent flow), hence, the floating amount of the optical element 16 due to the above air flow from the recording layer 18a of the recording medium 18 is stabilized. Accordingly, the accuracy of recording and/or reproducing information on the recording layer 18a of the recording medium 18 via the optical element 16 is improved.

Further, the groove 54 may desirably be modified in the shape, length, depth, and the like, depending on the purpose of the groove 54.

Figure 8A:
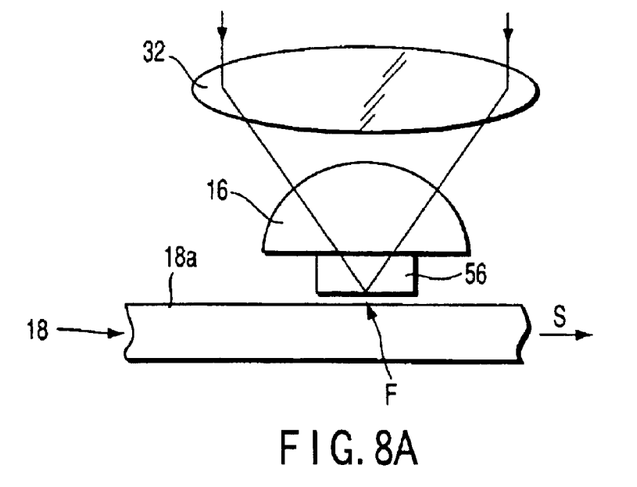
FIG. 8A is a schematic side view of a second modification of the semi-spherical SIL employed as the optical element in the optical pickup of the second embodiment of the present invention.
Figure 8B:
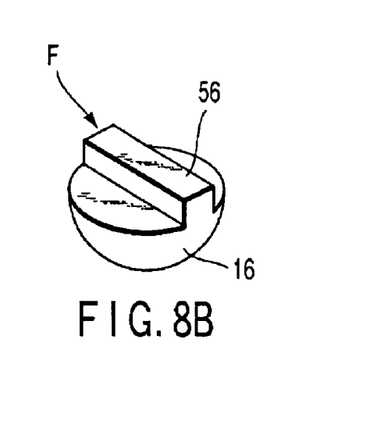
FIG. 8B is a perspective view, seen from below, of the second modification shown in FIG. 8A.

Further, as shown in FIGS. 8A and 8B, the contaminant attracting portion 50 can be structured by forming a square shaped projection 56 projecting towards the recording layer 18a of the recording medium 18, on a portion including at least the optically effective area F in a surface portion of the optical element 16 positioned on the recording medium side of the optical element 16.

The projection 56 may be formed integral with the optical element 6 during producing of the optical element 6, or formed by mechanically cutting the other area than the optically effective area F in the surface portion of the optical element 16 positioned on the recording medium side of the optical element 16 after the optical element 16 has been formed. The projection 56 is preferably formed to extend in a direction across the rotating direction S of the recording medium 8.

When the optical element 16 comes very close to the recording layer 18a of the recording medium 18 rotated at a high speed for performing recording and/or reproducing information on the recording layer 18a of the recording medium 18, the projection 56 formed on the surface portion of the optical element 16 positioned on the recording medium side of the optical element 16, narrows an air flow passage between the surface portion of the optical element 16 positioned on the recording medium side of the optical element 16 and the recording layer 18a of the recording medium 18. Thus, the air flow, which flows between the surface portion of the optical element 16 positioned on the recording medium side of the optical element 16 and the recording layer 18a of the recording medium 18 while the recording medium 18 is rotated at a high speed during the recording and/or reproducing information on the recording layer 18a of the recording medium 18 is performed, is increased in its flow speed and pressure in the portion including the optically effective area F, on which the projection 56 is provided. Since contaminant scattered from the recording medium 18 rotated at the high speed is blown off from the optically effective area F by the air flow increased in its speed and pressure, contaminant is prevented from adhering and depositing on the optically effective area F. As a result, lowering of the optical properties of the optical element 16 due to contaminant does not occur, the optical pickup 10 of this embodiment can stably perform recording and/or reproducing information on the recording layer 18a of the recording medium 18 for a long period of time.

Figure 9A:
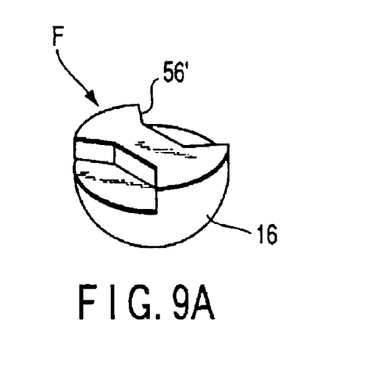
FIG. 9A is a perspective view, seen from below, of a third modification of the semi-spherical SIL employed as the optical element in the optical pickup of the second embodiment of the present invention.
Figure 9B:
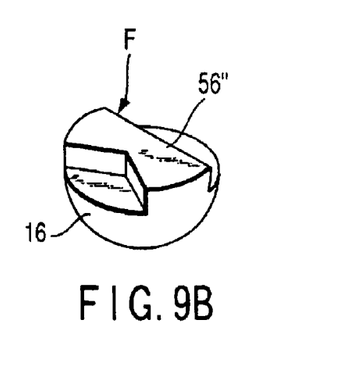
FIG. 9B is a perspective view, seen from below, of a fourth modification of the semi-spherical SIL employed as the optical element in the optical pickup of the second embodiment of the present invention.

The projection 56 may be modified in its plain configuration or projecting amount depending on a purpose of application thereof. For example, as shown in FIGS. 9A and 9B, when the projection 56' or 56" is formed, which has the plain surface configuration the center portion of which in its extending direction is narrowed, the air flow on the recording layer 18a of the recording medium 18 rotated at a high speed is concentrated in the narrowed center portion during the recording and/or reproducing information is performed on the recording layer 18a, thereby further increasing the speed and pressure of the air flow in the portion including the optically effective area F on which the projection 56 is provided.

Figure 10:
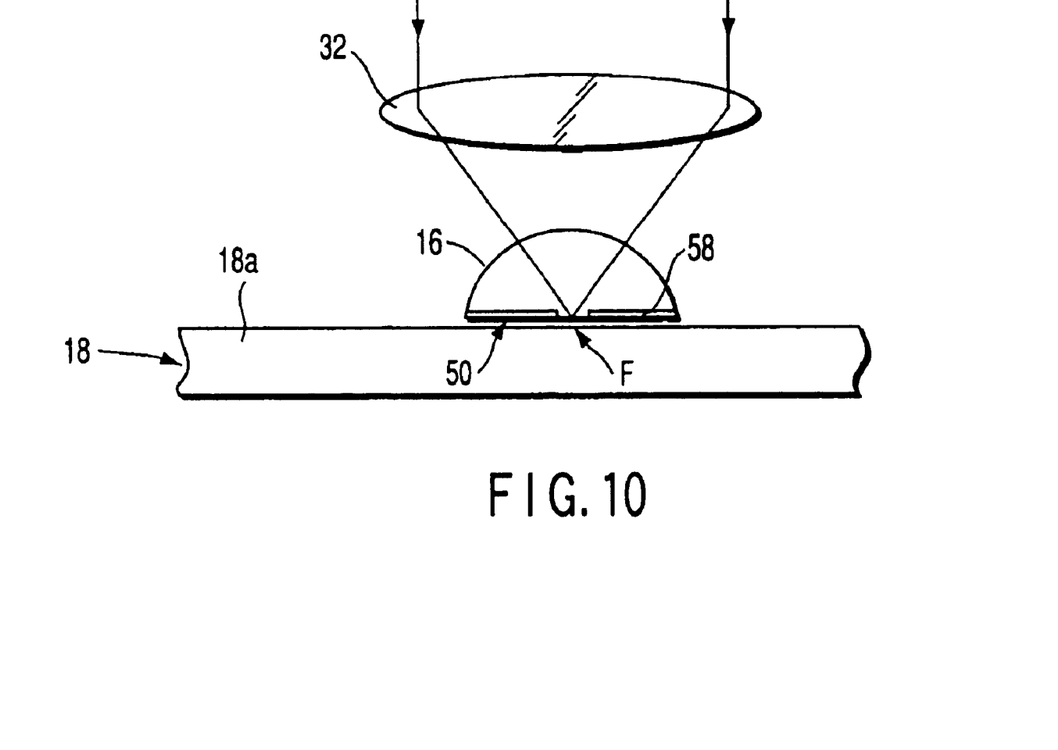
FIG. 10 is a schematic side view of a fifth modification of the semi-spherical SIL employed as the optical element in the optical pickup of the second embodiment of the present invention.

The contaminant attracting portion 50 may be constituted with a thin film 58 of metallic oxide as shown in FIG. 10. The metallic oxide in this embodiment preferably includes, for example tantalum oxide, silicon oxide, titanium oxide, zirconium oxide, aluminum oxide and the like.

The thin film 58 is formed, for example by vapor deposition (chemical vapor deposition, physical vapor deposition) of the metallic oxides on the area except the optically effective area F of the surface portion of the optical element 16 positioned on the recording medium side thereof, after covering the optically effective area F of the surface portion of the optical element 16 positioned on the recording medium side of the optical element 16 with a mask (not shown) which is slightly larger (about by 10 m) in its diameter than the optically effective area F. The thin film 58 has a high surface energy (the contaminant attracting capability) whose contact angle of water is 10 degrees or less.

The thin film 58 has the surface energy (the contaminant attracting capability) which is much higher than that of the optically effective area F, thus, the contaminant (e.g. vapor, organic materials, or dusts in the air) scattered from the recording medium 18 rotated at a high speed during recording and/or reproducing information on the recording layer 18a of the recording medium 18 is performed is strongly attracted to the thin film 58 and are preferentially attached on the thin film 58. Therefore, the adhering and deposition of the contaminant on the optically effective area F is prevented and the optical properties of the optical element 16 does not be lowered due to the contaminant. Accordingly, the optical pickup 10 of this embodiment can stably perform recording and/or reproducing information on the recording layer 18a of the recording medium 18 for a long period of time.

Incidentally, like the case of the various water-repellent portions 40 in the first embodiment and its various modifications of the above-mentioned invention, the various contaminant attracting portions 50 in the second embodiment and its various modifications which have been described with reference to FIGS. 6 to 10 are applicable to a SIL serving as the optical element 16 having a shape in which the area other than the optically effective area F in the surface portion of the optical element 16 positioned on the recording medium side is beveled or chamfered as shown in FIG. 3, or a SIL serving as the optical element 16 having a shape where the area other than the optically effective area F in the surface portion of the optical element 16 positioned on the recording medium side is set back from the optically effective area F as shown in FIG. 4A or 4B.

Figure 11:
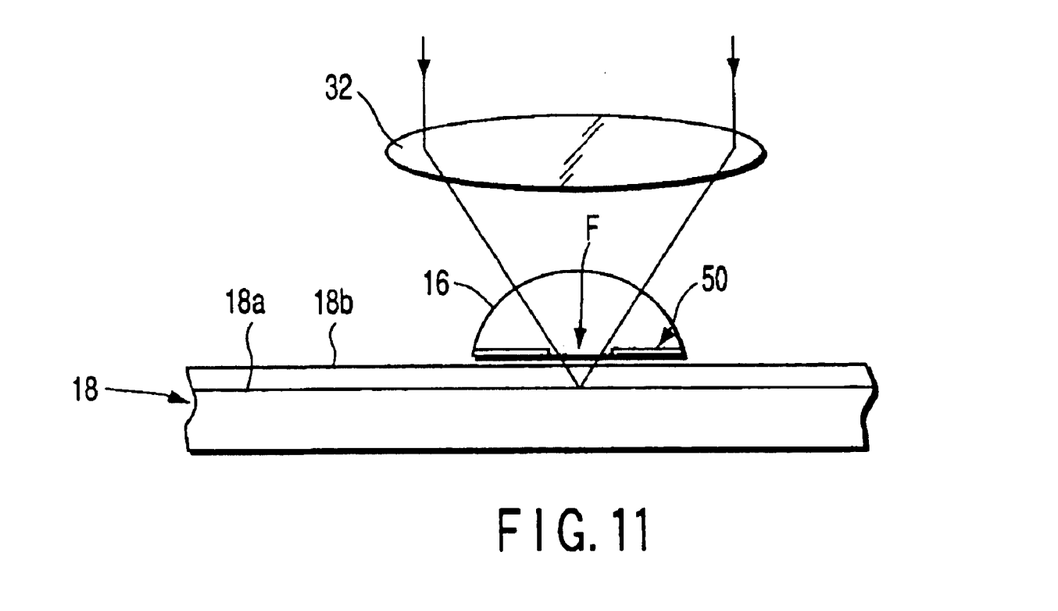
FIG. 11 is a schematic side view showing a state in which the semi-spherical SIL is used for a recording medium whose recording surface is covered with a transparent protective film.

Also as illustrated in FIG. 11, even when a transparent protective film 18b is provided over the recording layer 18a of the recording medium 18, the optical pickup 10 according to the second embodiment and the modifications thereof, using the optical element 16 provided with the contaminant attracting portion 50, and thus featuring the technical spirit of the present invention can be applied to the recording medium 18.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An optical pickup comprising:

a light source for emitting a laser beam;

an optical system which converges the laser beam emitted from the light source; and an optical element having a function of increasing a numerical aperture of the optical system, wherein the optical pickup performs at least one of recording and reproducing information on a recording medium by using the laser beam from the light source while the optical element is brought in contact with or in close to the recording medium, and the optical element comprises a surface portion facing the recording medium and a contamination-preventing structure provided on the surface portion, and wherein the contamination-preventing structure of the optical element includes a contaminant attracting portion which is provided on an area excepting and neighboring an optically effective area on the surface portion of the optical element, and which attracts contaminant.

2. The optical pickup according to claim 1, wherein the optical element comprises a solid immersion lens.

3. The optical pickup according to claim 1, wherein the contaminant attracting portion comprises a rough surface which is rougher than the optically effective area on the surface portion of the optical element.

4. The optical pickup according to claim 3, wherein the rough surface is formed by one of chemically and physically etching the area except the optically effective area on the surface portion of the optical element.

5. The optical pickup according to claim 1, wherein the contaminant attracting portion comprises a plurality of grooves.

* * * * *